United States Patent
Mitchell et al.

(10) Patent No.: US 11,652,548 B1
(45) Date of Patent: May 16, 2023

(54) FREE SPACE OPTICAL COMMUNICATION TERMINAL WITH CHROMATIC RISLEY PRISM PAIR

(71) Applicant: SA Photonics, Inc., Los Gatos, CA (US)

(72) Inventors: Greg G. Mitchell, Elk Grove, CA (US); James F. Coward, Washougal, WA (US)

(73) Assignee: SA PHOTONICS, INC., Los Gatos, CA (US)

( * ) Notice: Subject to any disclaimer, the term of this patent is extended or adjusted under 35 U.S.C. 154(b) by 56 days.

(21) Appl. No.: 17/485,037

(22) Filed: Sep. 24, 2021

Related U.S. Application Data (60) Provisional application No. 63/083,007, filed on Sep. 24, 2020.

(51) Int. Cl.
*H04B 10/112* (2013.01)
*H04J 14/02* (2006.01)
*G02B 27/09* (2006.01)
*G02B 5/04* (2006.01)
*G02B 23/02* (2006.01)

(52) U.S. Cl.
CPC ........... *H04B 10/1123* (2013.01); *G02B 5/04* (2013.01); *G02B 23/02* (2013.01); *G02B 27/0972* (2013.01); *H04J 14/02* (2013.01)

(58) Field of Classification Search
CPC ......... H04B 10/11–118; H04B 10/1123; H04J 14/02; G02B 23/02; G02B 27/0972
USPC .................................... 398/11–118, 128–131
See application file for complete search history.

(56) References Cited

U.S. PATENT DOCUMENTS

| | | | | |
|---|---|---|---|---|
| 10,298,325 | B1* | 5/2019 | Birnbaum | H04B 10/40 |
| 11,002,956 | B1* | 5/2021 | Carlson | G02B 26/0891 |
| 11,476,933 | B1* | 10/2022 | Mitchell | H04B 10/11 |
| 2005/0249502 | A1* | 11/2005 | Chen | G02B 27/4211 |
| | | | | 398/118 |
| 2007/0024978 | A1* | 2/2007 | Jackson | G02B 27/4233 |
| | | | | 359/569 |
| 2007/0242274 | A1* | 10/2007 | Cluff | G02B 26/0891 |
| | | | | 356/445 |
| 2009/0256949 | A1* | 10/2009 | Rana | H04N 5/2259 |
| | | | | 348/340 |
| 2010/0271719 | A1* | 10/2010 | Sanghera | G02B 26/0875 |
| | | | | 359/837 |

(Continued)

*Primary Examiner* — Li Liu
(74) *Attorney, Agent, or Firm* — BakerHostetler; Tayan B. Patel (57) ABSTRACT

Embodiments relate to a free space optical (FSO) terminal that transmits and receives (e.g., data-encoded) optical beams. The FSO terminal includes a fore optic (e.g., telescope) and a chromatic Risley prism pair. A receive (Rx) optical beam is received through the fore optic, and a transmit (Tx) optical beam is transmitted through the fore optic. The chromatic Risley prism pair is positioned along the optical paths of both the Rx and Tx optical beams. Since the Rx and Tx optical beams have different wavelengths and the chromatic Risley prism pair has a wavelength dependence, the chromatic Risley prism pair creates an angular separation between the Rx and Tx optical beams. A controller controls the Risley prism pair (and possibly also the wavelength of the Tx optical beam) to achieve a desired angular separation between the Rx and Tx optical beams in free space.

20 Claims, 10 Drawing Sheets

(56) References Cited

U.S. PATENT DOCUMENTS

2015/0215040 A1* 7/2015 Dickson .............. H04B 10/1125
                                                        398/131
2017/0336499 A1* 11/2017 Ito .......................... G01S 7/4817
2017/0371029 A1* 12/2017 Axelsson ................ G01S 17/42

* cited by examiner

FREE SPACE OPTICAL COMMUNICATION TERMINAL WITH CHROMATIC RISLEY PRISM PAIR

CROSS-REFERENCE TO RELATED APPLICATIONS

This application claims priority under 35 U.S.C. § 119(e) to U.S. Provisional Patent Application Ser. No. 63/083,007, "Free Space Optical Communication System with Risley Pair for Variable TX/RX Pointing," filed Sep. 24, 2020, which is incorporated herein by reference in its entirety.

BACKGROUND

1. Technical Field

This disclosure relates generally to free space optical (FSO) communication terminals and, more particularly, to a FSO communication terminal with a chromatic Risley prism pair.

2. Description of Related Art

Free space optical (FSO) communications is a communications technology that uses light propagating in free space to wirelessly transmit data, for example, for telecommunications or computer networking. Free space is a communications medium that can include air, outer space, or vacuum and contrasts with guided wave communications, such as optical fibers. FSO technology is useful where physical connections are impractical due to high costs or other considerations.

In contrast with other electromagnetic communications means, FSO signals (also referred to as beams because of their typically low divergence) are more directional. The directionality confers benefits both for communications capacity and for communications privacy. However, FSO technology typically requires accurate pointing between terminals to establish and maintain a viable FSO link. Furthermore, some FSO terminals may benefit from transmitted beams and received beams that propagate along different directions.

SUMMARY

Some embodiments relate to a free space optical (FSO) terminal that transmits and receives (e.g., data-encoded) optical beams, for example to and from a remote FSO terminal. The FSO terminal includes a fore optic (e.g., telescope) and a chromatic Risley prism pair. A receive (Rx) optical beam is received through the fore optic, and a transmit (Tx) optical beam is transmitted through the fore optic. The chromatic Risley prism pair is positioned along the optical paths of both the Rx and Tx optical beams. Since the Rx and Tx optical beams have different wavelengths and the chromatic Risley prism pair has a wavelength dependence, the chromatic Risley prism pair creates an angular separation between the Rx and Tx optical beams. The angular separation is adjustable by adjusting the configuration of the Risley prism pair. The controller controls the Risley prism pair (and possibly also the wavelength of the Tx optical beam) to achieve a desired angular separation between the Rx and Tx optical beams in free space.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Chromatic Risley Prism System

Figure 1A:
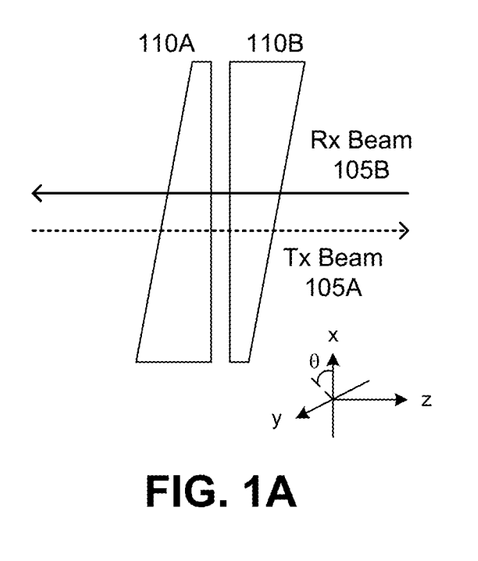
FIG. 1A-1C are diagrams of a chromatic Risley prism pair that directs Tx and Rx beams with different wavelengths.
Figure 1B:
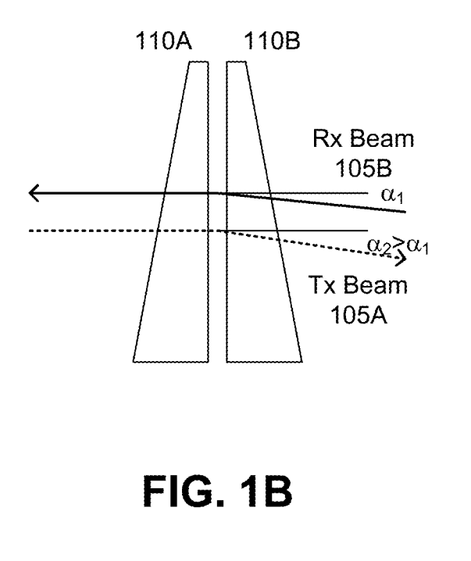
Figure 1C:
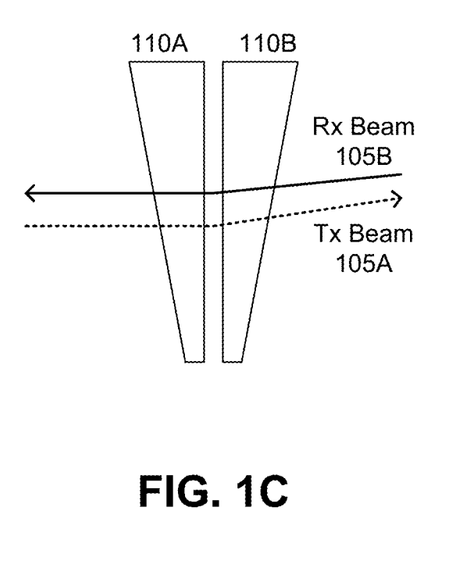

In some embodiments, a free space optical (FSO) terminal includes a chromatic Risley prism pair positioned along optical paths of both the Rx and Tx beams. Since the Tx and Rx beams have different wavelengths, a wavelength dependence of the chromatic Risley prism pair results in an angular separation of the Tx and Rx beams in free space. FIGS. 1A-1C are diagrams illustrating operation of a chromatic Risley prism pair 110 that directs Tx and Rx beams with different wavelengths.

The chromatic Risley prism pair 110 includes two prisms 110A and 110B, each of which may be rotated around the optical axis (z-axis). The angular position of the two prisms 110 relative to each other determines the amount of angular separation introduced by the prism pair. The angular position of the two prisms relative to a fixed reference (e.g., the average azimuth angle θ of the two prism) determines the azimuthal direction of the angular separation.

The Risley prism pair 110 is chromatic because different wavelength beams are refracted by different amounts. For example, each prism 110A and 110B may be constructed from a highly dispersive material. Alternatively, different materials may be used for the two prisms. One prism 110 may be highly dispersive and the other closer to achromatic. Alternatively, one prism may have a positive dispersion and the other may be a prism or diffraction grating with negative dispersion. To reduce the size or weight of the chromatic Risley prism pair 110 but still have enough angular separation, the prisms may be fabricated from a high-dispersion material such as silicon. In some embodiments, the prisms 110 have an index of refraction between 1.5 and 4.2.

In the example of FIG. 1, the two Risley prisms 110 are the same. In FIG. 1A, the two Risley prisms are rotated 180 degrees relative to each other. The orientation of the wedge angles are in opposite directions. Prism 110A is thick at the bottom and thin at the top, while prism 110B is thick at the top and thin at the bottom. Any refraction introduced by one prism is counteracted by the other prism, for a net bending of zero. Both the Rx beam 105B and Tx beam 105A pass through the prism pair without angular deflection.

In FIG. 1B, the two Risley prisms are aligned to each other. Prism 110B is rotated 180 degrees relative to FIG. 1A. Here, both wedges 110 are thick at the bottom and thin at the top. As a result, the Rx beam 105B is refracted downward at angle $\alpha_1$ and the Tx beam 105A is refracted downward at angle $\alpha_2$, where $\alpha_1$ and $\alpha_2$ result from the Rx and Tx wavelengths and the variation of index of refraction of the Risley prisms 110 as a function of wavelength. In this example, $\alpha_2$ is larger than $\alpha_1$. However, this is not required. If the Risley prism pair 110 is a diffractive device, $\alpha_1$ and $\alpha_2$ may result from diffraction rather than refraction. Different amounts of bending $\alpha$ and $\Delta\alpha=\alpha_2-\alpha_1$ may be achieved by rotating the prisms relative to each other by different amounts.

In FIG. 1C, the two Risley prisms are also aligned to each other as in FIG. 1, but the pair 110 is rotated by 180 degrees relative to FIG. 1. As a result, the Rx beam 105B is refracted upward at angle $\alpha_1$ and the Tx beam 105A is refracted upward at angle $\alpha_2$. The bending may be oriented along different azimuth angles $\theta$ by rotating the Risley prism pair by different amounts.

Figure 2:
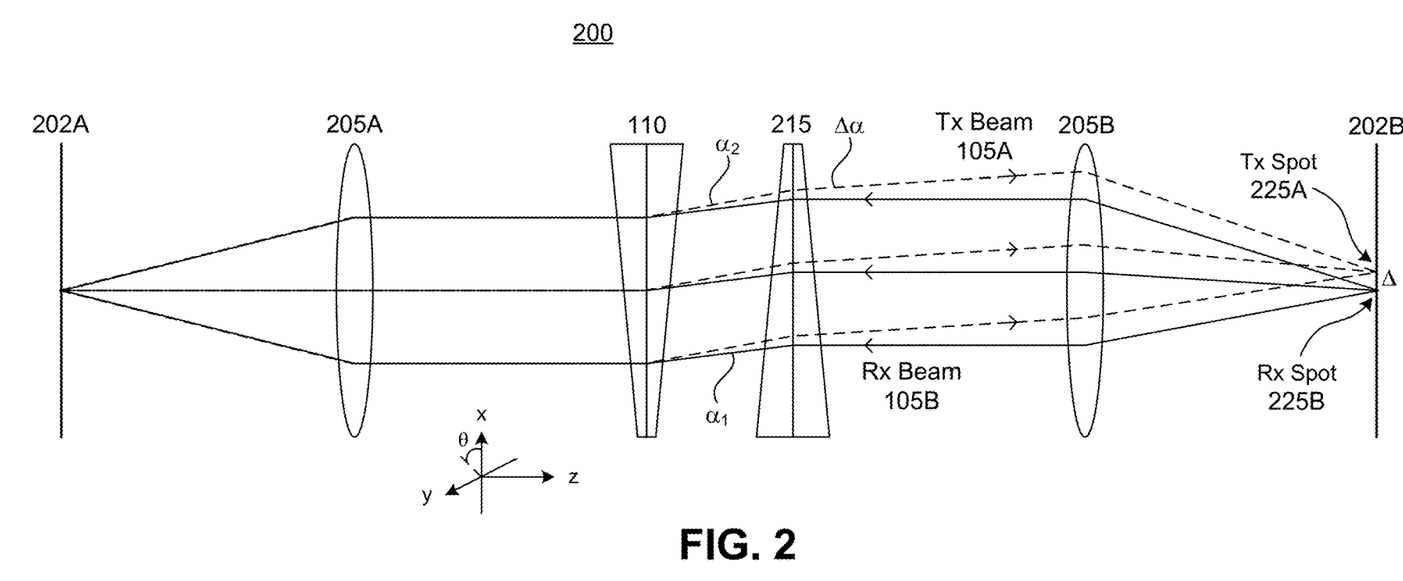
FIG. 2 is a cross-section diagram of a Risley prism system with a relay lens and chromatic Risley prism pair.
Figure 3:
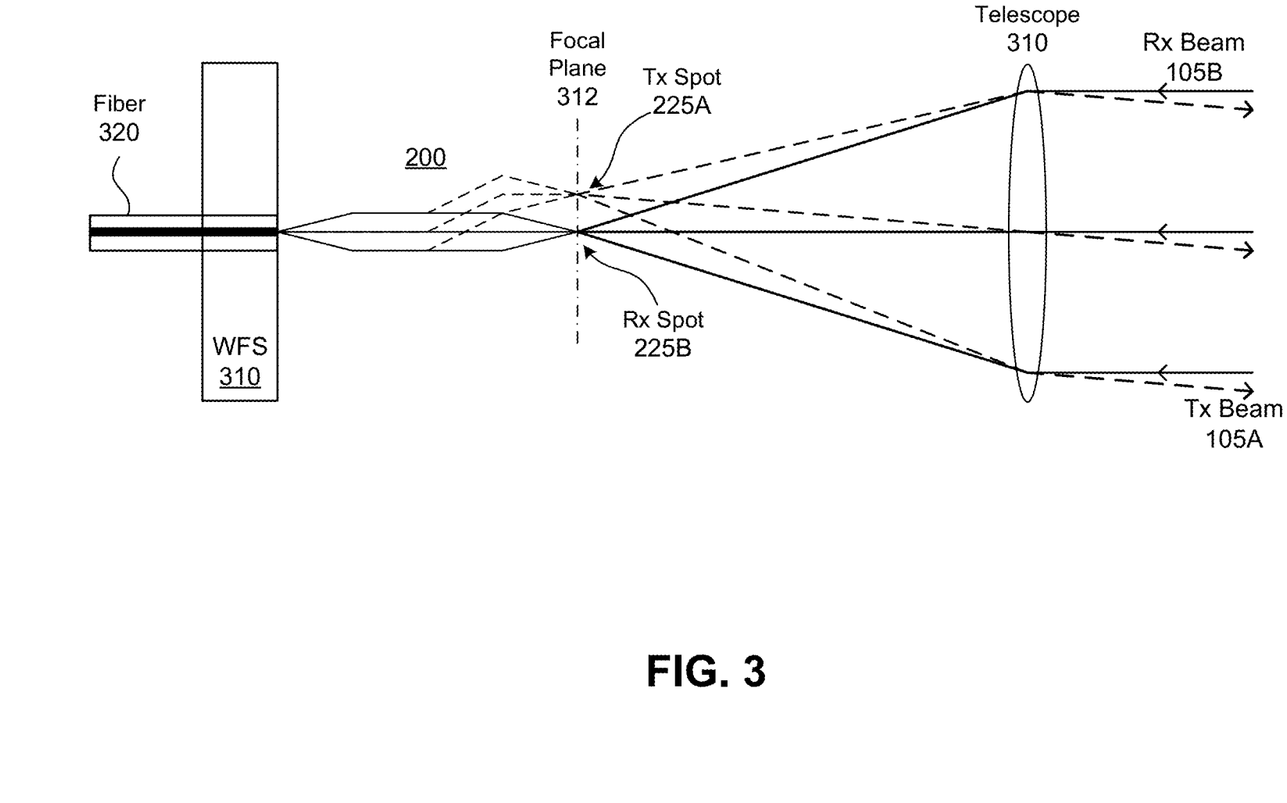
FIG. 3 is a cross-section diagram of a free space optic (FSO) terminal.

FIG. 1 illustrates the chromatic Risley prism pair 110 in isolation to demonstrate how it affects the beams. However, the chromatic Risley prism pair 110 may be part of a telescope or another optical component within an FSO terminal, as shown in FIGS. 2 and 3. FIG. 2 is a cross-section diagram of a Risley prism system with a relay lens and chromatic Risley prism pair. FIG. 3 is a cross-section diagram of a FSO terminal using the Risley prism system shown in FIG. 2.

In the system of FIG. 2, a relay lens 205A,B images between two conjugates 202A and 202B. The chromatic Risley prism pair 110 is positioned in the space between the two lenses 205A and 205B. In this space, the rays from points on the conjugates 202 are collimated or near-collimated, rather than converging or diverging, and such a space will be referred to as a collimated space. An achromatic Risley prism pair 215 is also positioned in the collimated space of this system. Assume that the Tx beam 105A and Rx beam 105B are located at the same spot at conjugate 202A. From left to right, the chromatic Risley prism pair 110 bends the Tx beam by $\alpha_2$ and bends the Rx beam by $\alpha_1$. This introduces an angular difference of $\Delta\alpha=\alpha_2-\alpha_1$, but with a common mode angle of $(\alpha_2+\alpha_1)/2$. The achromatic Risley prism pair 215 compensates for this common mode offset. In this example, the achromatic Risley prism pair 215 reduces the angle of both beams by $\alpha_1$. The Rx beam 105B is then propagating at an angle $\alpha=0$, and the Tx beam 105A is propagating at an angle $\Delta\alpha$. The relay lens 205B converts the collimated beams 105B and 105A to Rx spot 225B and Tx spot 225A, respectively. The angular difference Aa is converted to a spatial difference A at conjugate 202B.

FSO Communication Terminals

FIG. 3 is a cross-section diagram of a free space optic (FSO) terminal, that includes a telescope 310, the Risley prism system 200 shown in FIG. 2, and a wavefront sensor 310 and optical fiber 320. Conjugate 202A of the Risley prism system 200 couples to the fiber 320. Conjugate 202B of the Risley prism system 200 is coincident with the focal plane 312 of telescope 310. In the transmit direction, the Tx beam 105A propagates down fiber 320, is relayed by the Risley prism system 200 to Tx spot 225A on the focal plane, and this is projected by the telescope 310 into free space as Tx beam 105A. In the receive direction, Rx beam 105B in free space is received by telescope 310 and focused to Rx spot 225B, which is relayed by the Risley prism system 200 into fiber 320. In this example, the fiber 320 is a double-clad fiber where the Tx beam 105A propagates through the single-mode core and the Rx beam 105B is coupled into the multi-mode cladding.

If the wavelengths of the Tx and Rx beams 105 are fixed and the configuration of the Risley prism system 200 is not changed, then the lateral separation of spots 225B, 225A and the angular separation of beams 105B, 105A in free space will also be fixed. However, as described above, the Risley prism system 200 has four degrees of freedom which allows the locations of spots 225A,B and the angular direction of corresponding beams 105A,B to be adjusted. In addition, the Tx and/or Rx wavelengths may be adjustable, which would provide an additional degree of freedom to adjust the directions of the Tx and Rx beams.

Figure 4A:
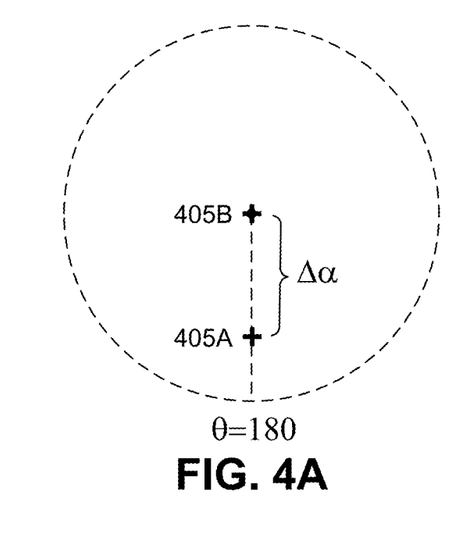
FIGS. 4A-4C are diagrams showing the effect of adjusting the Risley prism system.
Figure 4B:
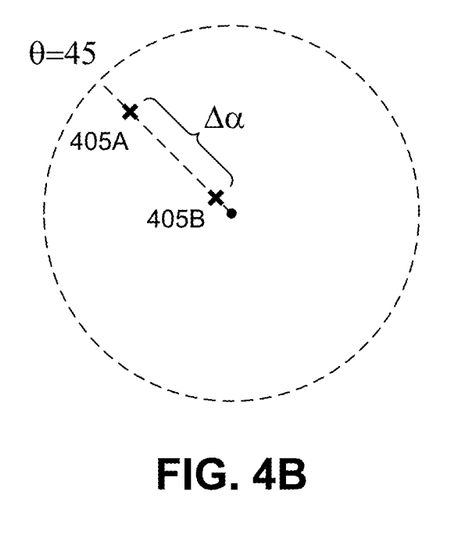
Figure 4C:
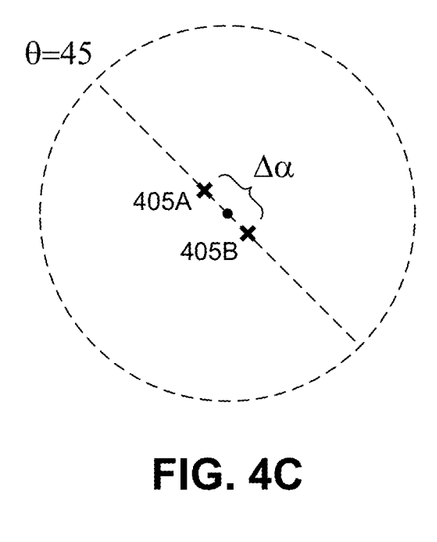

FIGS. 4A-4C are diagrams showing the effect of adjusting the Risley prism system. These diagrams are in polar coordinates, where each+marks the propagation direction of the Tx and Rx beams, respectively. The polar coordinate $\theta$ is the azimuth angle $\theta$. The radial coordinate $\alpha$ is the angle relative to the z-axis. An angle $\alpha=0$ is a beam that is propagating on-axis along the z-axis. Large angles $\alpha$ correspond to beams that are propagating more off-axis.

FIG. 4A corresponds to the situation shown in FIGS. 2 and 3. The prisms within the chromatic Risley prism pair 110 are rotated relative to each other to create the angular separation Aa, and the prisms within the achromatic Risley prism pair 215 are rotated relative to each other to reduce the common mode angular deflection so that the Rx beam 405B is on-axis. Both prism pairs 110, 215 are rotated so that the Tx beam 405A propagates at azimuth angle $\theta=180$ degrees.

In FIG. 4B, both prism pairs 110, 215 are rotated so that the beams now propagate along azimuth angle $\theta=45$ degrees. In addition, the common mode compensation introduced by the achromatic Risley prism pair 215 is reduced by adjusting the angular positions of the two prims 215 relative to each other. As a result, the Rx beam 405B is slightly off-axis. The relative positions of the two prisms in the chromatic pair 110 are not changed, so the angular separation Aa remains the same as in FIG. 4A.

In FIG. 4C, the angular positions of the prisms 110 is adjusted so that the angular separation Aa is reduced. The achromatic Risley prism pair 215 is adjusted to eliminate the common mode offset. As a result, the beams 405 propagate at angles $+\Delta\alpha/2$ and $-\Delta\alpha/2$ relative to the 45 degree azimuth. Alternatively to the second Risley prism pair 215, steering mirrors added to the optical path could reduce the offset. This could be of advantage in designs where folding mirrors are already present. Another alternative approach to achieve compensation for offset would be to rotate the entire terminal.

In the examples of FIG. 4, the two optical beams 405 lie along the same radius, but this is not required. The chromatic Risley prism pair 110 provides two degrees of freedom to adjust the angular separation Aa, and the achromatic Risley prism pair 215 provides two degrees of freedom to adjust the common mode compensation. These four degrees of freedom can be used to set beam directions 405 that do not lie along the same radius.

In most cases, advantage is gained if the design accomplishes only the necessary separation, as weight and component costs increase with wider-range separation capability, while undesired aberrations increase. For typical spacecraft applications in Earth orbit, for example, point-ahead separation is always less than 100 μrad (microradians), so the angular separation introduced by the Risley prism system may be adjustable over a range of at least 50 μrad.

Thus, desired beam directions may be achieved by controlling the Risley prism system. In some cases, the Risley prism system may be calibrated, and the controller uses a calibration lookup table or other calibration reference to determine the correct settings. Calibration can be used to account for nonlinearity in the wavelength dependence and also for manufacturing variations.

The system shown in FIG. 2 is just one example. Other designs may also be used. For example, other mechanisms other than an achromatic Risley prism pair 215 may be used to compensate for common mode deflection introduced by the chromatic Risley prism pair 110. Alternatively, a second chromatic Risley prism pair of different design may be used in combination with the first 110.

Figure 5A:
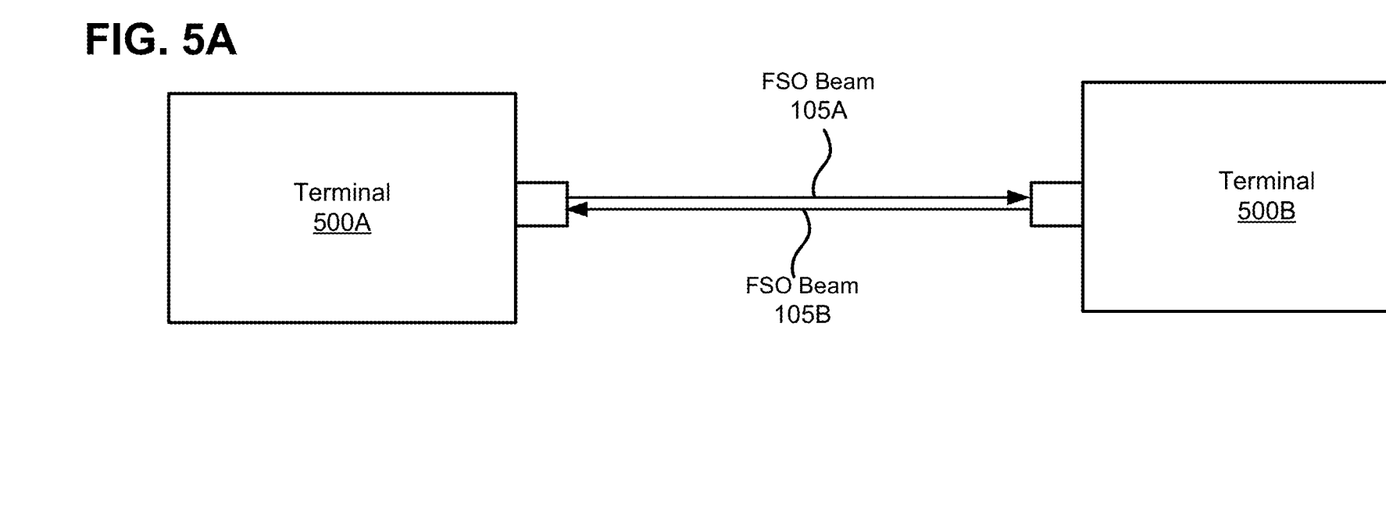
FIGS. 5A and 5B are block diagrams of two terminals communicating via FSO communication links.
Figure 5B:
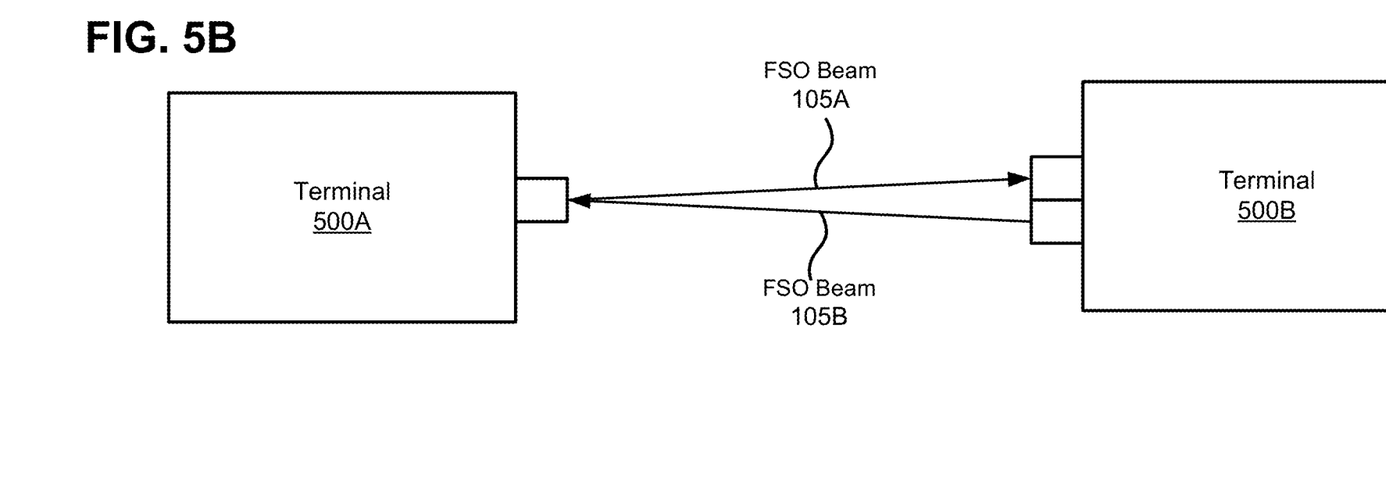
Figure 6A:
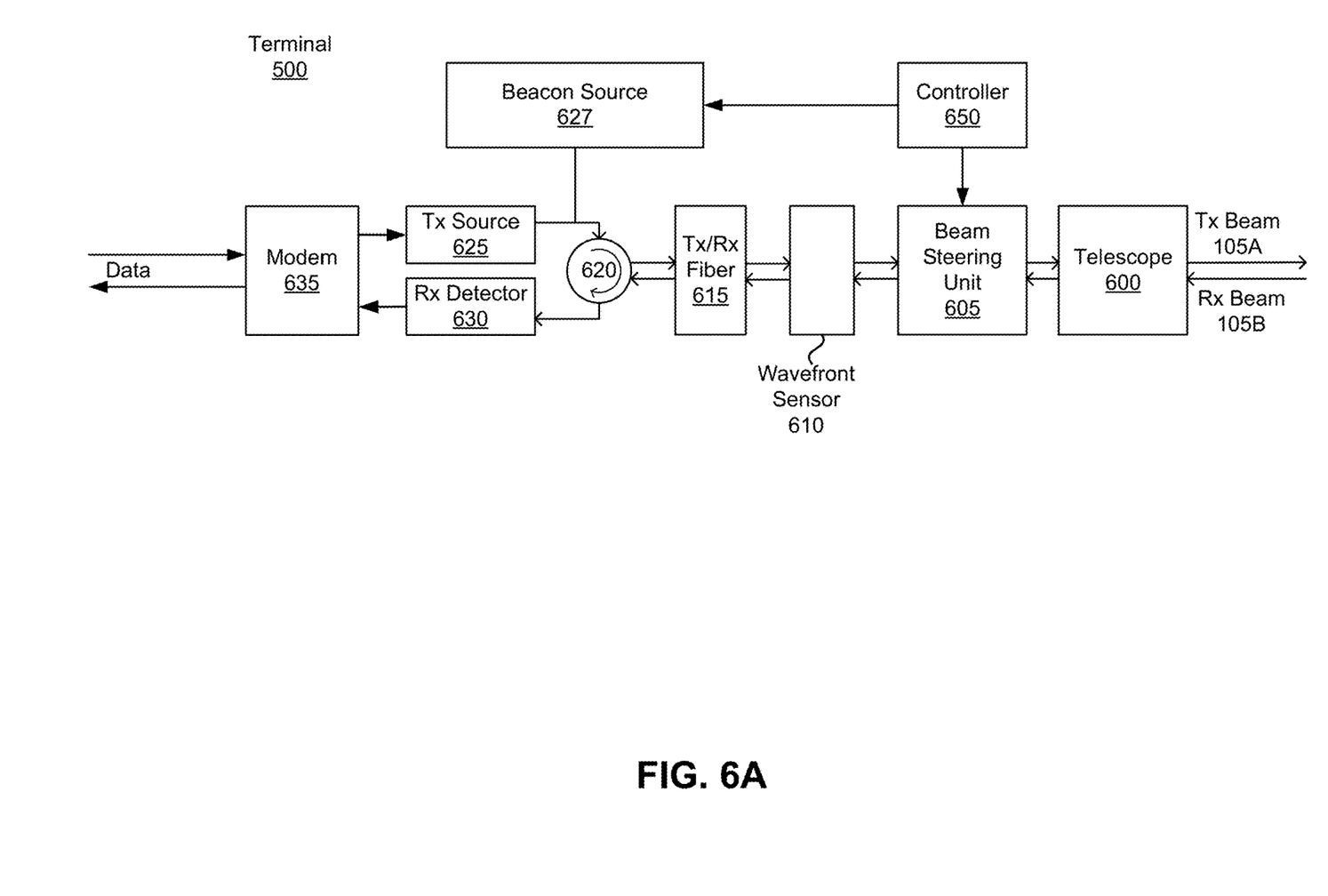
FIG. 6A is a block diagram of a single terminal.
Figure 6B:
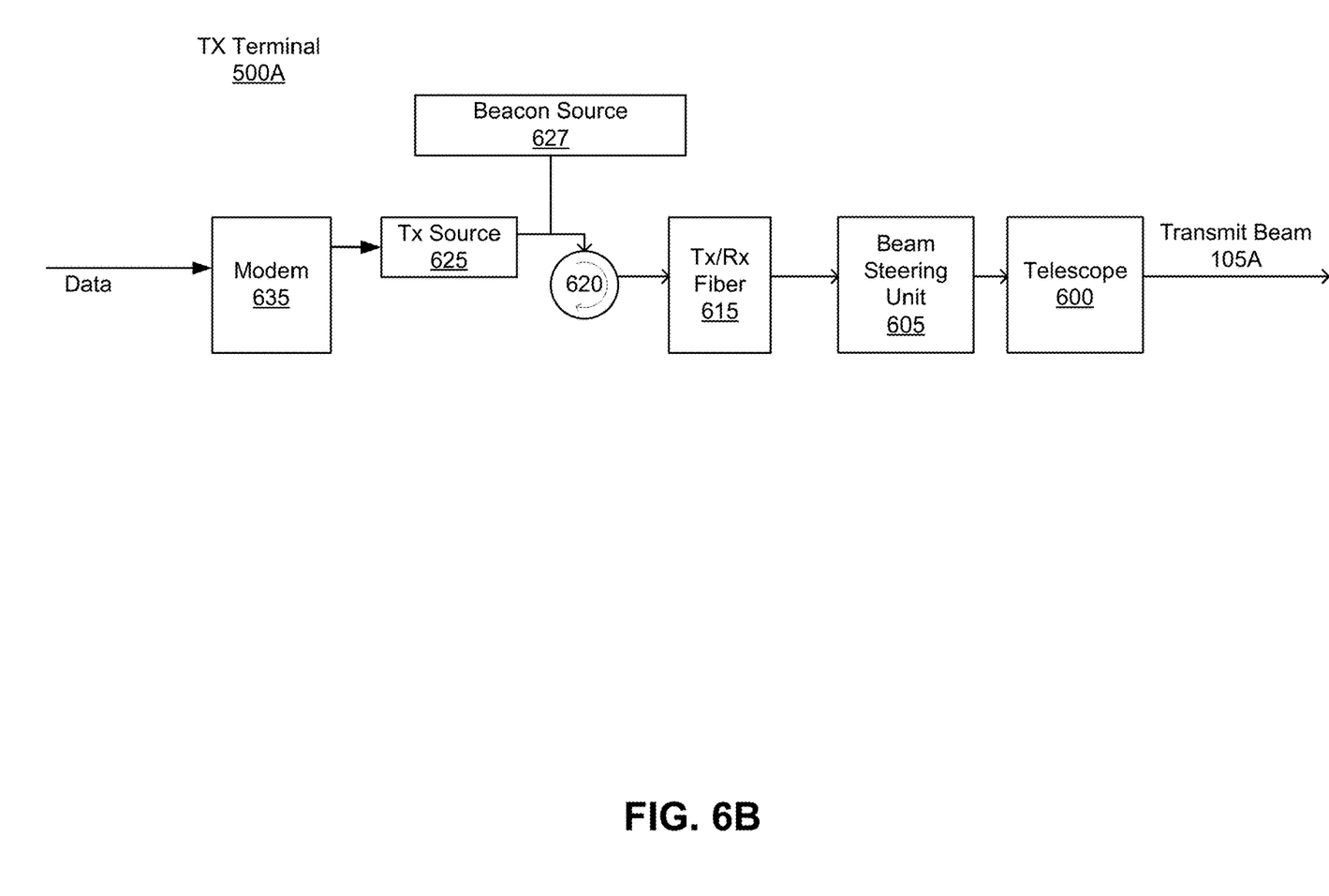
FIGS. 6B-6C are block diagrams of a single FSO communication link.
Figure 6C:
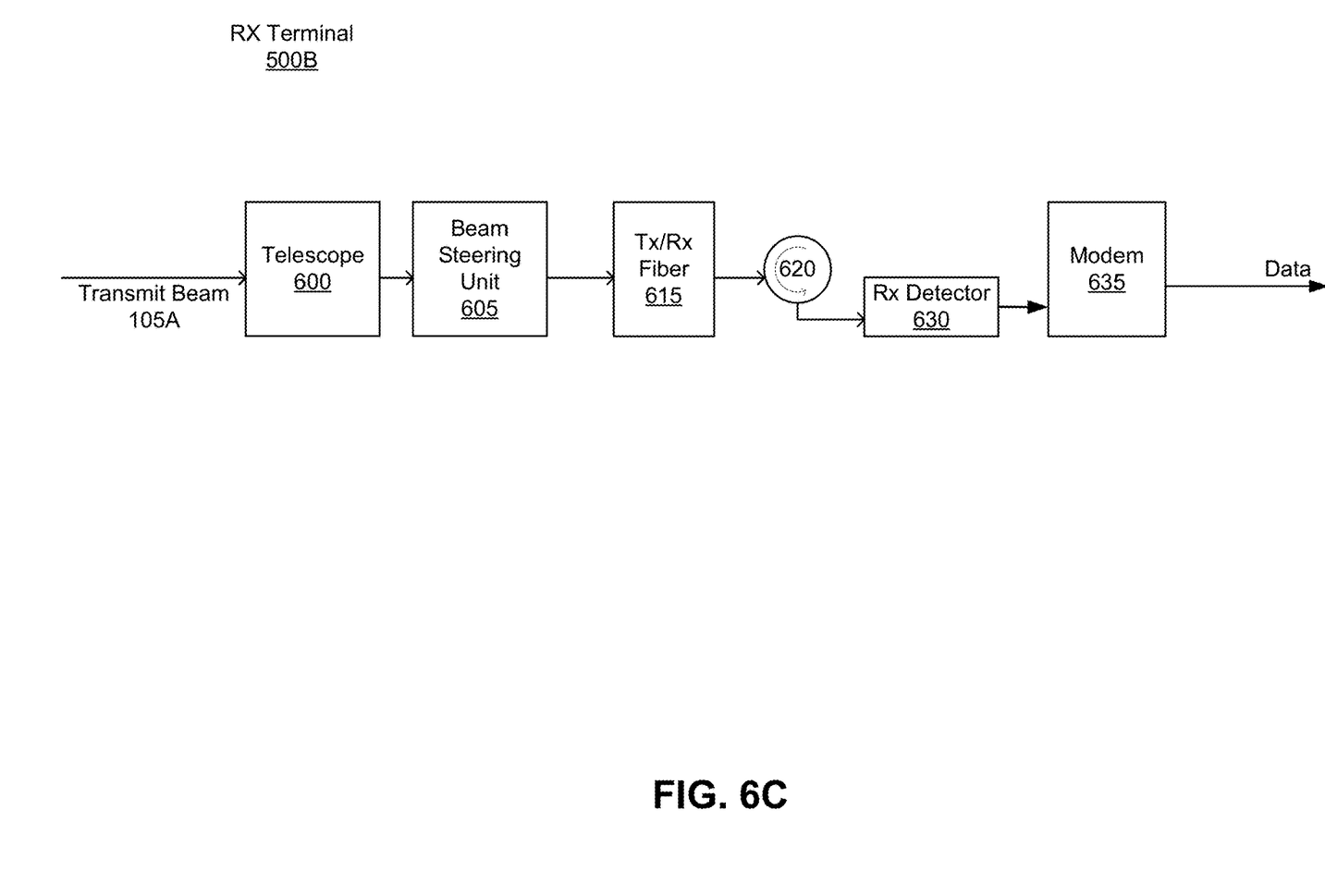
Figure 7A:
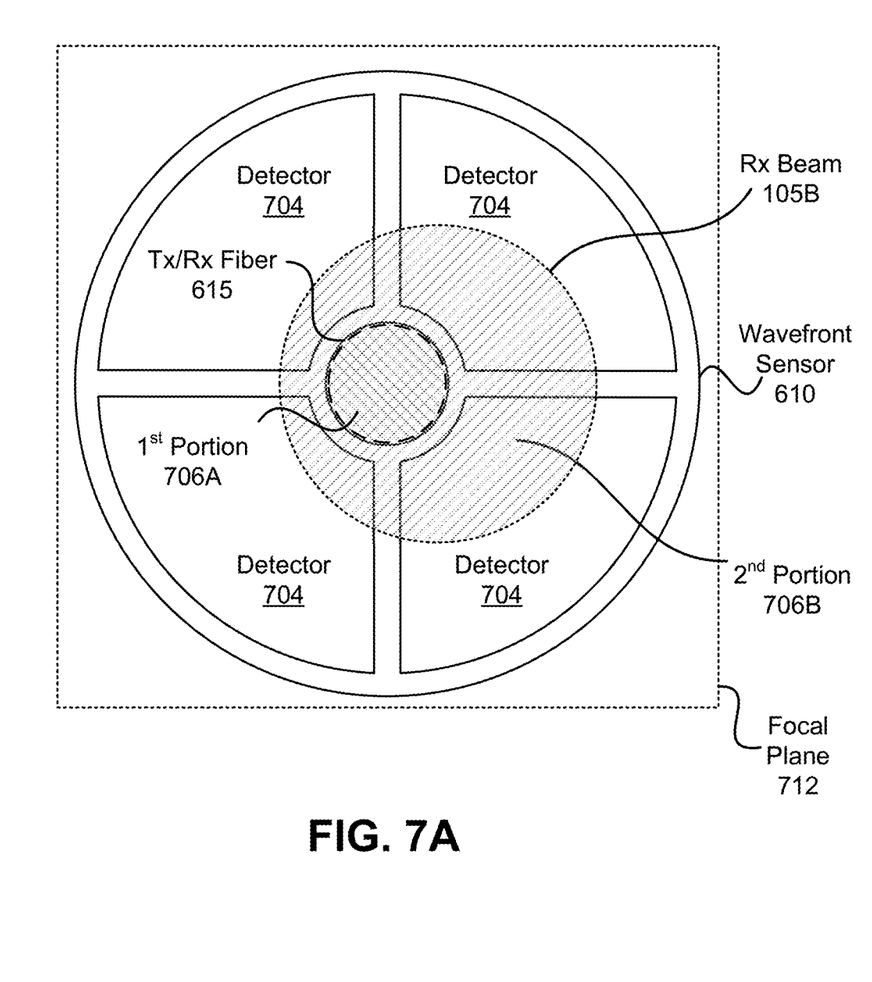
FIGS. 7A-7B are diagrams of a wavefront sensor at a telescope focal plane.
Figure 7B:
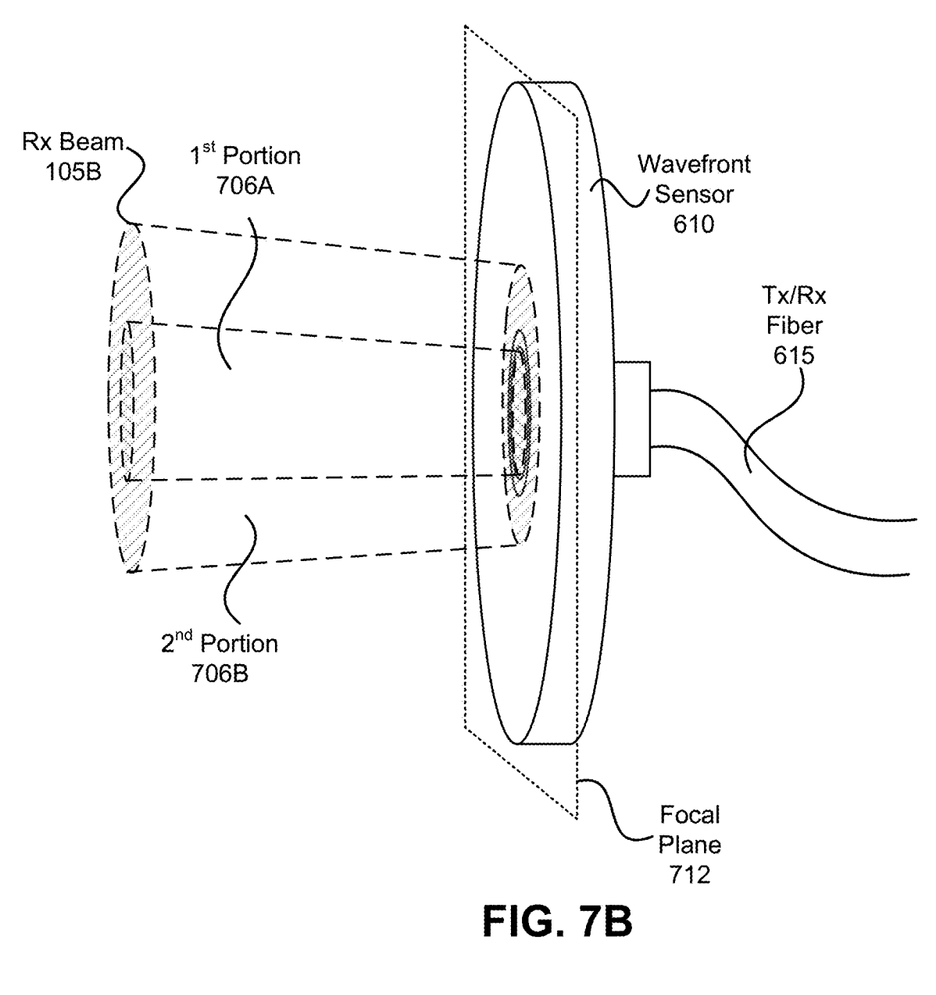

FIGS. 5-7 further describe operation of FSO terminals. FIGS. 5A and 5B are block diagrams of terminals 500A and 500B (also referred to as nodes) communicating via free space optical (FSO) communication links, according to some embodiments. The terminals 500 are communicating by transmitting and receiving FSO beams 105. In FIG. 5A, both terminals 500 are co-boresighted so that beams 105 are received and transmitted though the same aperture. In FIG. 5B, terminal 500A is co-boresighted, but terminal 500B uses separate apertures. In the co-boresighted approach, the same primary optical system may carry signals both for Tx and Rx paths, reducing weight and complexity of separate optical components for Tx and Rx beams. A co-boresighted optical design also simplifies the system and enhances reliability by eliminating separate pointing and tracking mechanisms for Tx and Rx. As described herein, if terminal 500A is referenced as a local terminal, terminal 500B may be referred to as a remote terminal, beam 105A may be referred to as a transmit (Tx) beam, and beam 105B may be referred to as a receive (Rx) beam.

Terminals 500 typically transmit and receive beams at different wavelengths to avoid or reduce beam interference. These wavelengths may be predetermined according to FSO communication standards or specifications. Typically, two wavelengths (or wavelength ranges) are available for selection, where one wavelength is selected for the Tx beam and the other wavelength is selected for the Rx beam (although more than two wavelengths may be available). For example, the Rx beam has a wavelength of 1532 nanometers, and the Tx beam has a wavelength of 1536 nanometers (note that these wavelengths are switched for the remote terminal). In cases where many terminals communicate pairwise, each terminal may be configured to transmit or receive on either of the two wavelengths. In this way, any terminal can communicate with any other terminal. Many optical telecommunications entities use the wavelength grid recommendations defined by the ITU (International Telecommunication Union) (e.g., publication G.694.1 or G.694.2). It may be beneficial to select Tx and Rx wavelengths from ITU grids or from the wavebands they cover because reliable, highly tested equipment may be readily and cheaply available. For some embodiments, one or both of the Tx and Rx wavelengths may be within 100 nm of 1064 nm, where Nd:YAG lasers and compatible photodetectors are readily available.

In both FIGS. 5A and 5B, the two FSO beams 105A,B may be propagating along slightly different directions. That is, they may not be strictly parallel to each other. In FIG. 5B, this is apparent because terminal 500B uses two separate apertures. Even in FIG. 5A, however, the two FSO beams 105A,B may have some angular separation, for example to accommodate a point-ahead angle resulting from relative motion between the two FSO communication terminals 500. As described above, the angular separation in the directions of the FSO beams 105 may be created by the different wavelength beams 105A,B propagating through a chromatic Risley prism pair. In some cases, the magnitude of the angular separation may also be controlled by adjusting the wavelength(s) of the optical beams 105.

FIG. 6A is a block diagram of a single terminal 500. The terminal 500 includes a data I/O interface (not shown), modem 635, Tx source 625, beacon source 627, Rx detector 630, a circulator 620, a Tx/Rx fiber 615, a wavefront sensor 610, a beam steering unit 605, a telescope 600, and a controller 650. In FIG. 6A, electrical signals (both analog and digital) are indicated by the solid arrows and optical signals (both guided and free space) are indicated by the line arrows.

The components are optically coupled as follows. The telescope 600 is optically coupled to the beam steering unit 605. The beam steering unit 605 is optically coupled to the wavefront sensor 610. It is also optically coupled to the circulator 620 via the fiber 615. The ports of the optical circulator 620 are optically coupled to the Tx source 625 and source 627 (which are combined into one port), the Tx/Rx fiber 615, and Rx detector 630.

The components are electrically coupled as follows. The controller 650 is electrically coupled to the beam steering unit 605 and the beacon source 627. The modem 635 is electrically coupled to the Tx source 625 and the Rx detector 630. The modem 635 may also receive data from the wavefront sensor 610 (after conversion to digital form) and it may provide data to the controller 650. In some embodiments, the controller 650 is electrically coupled to the wavefront sensor 610, and/or the modem 635.

FIGS. 6B and 6C illustrate one FSO communication link from a Tx terminal to a Rx terminal. Specifically, FIGS. 6B and 6C show the data path from Tx terminal 500A to Rx terminal 500B. FIG. 6B shows the data path in the Tx terminal 105A from incoming digital data to outgoing FSO transmit beam 105A. Modem 635 modulates the Tx source 625 based on the incoming data. The data-encoded light is transmitted by circulator 620, fiber 615, beam steering unit 605 to telescope 600, which directs the data-encoded FSO beam 105A to the Rx terminal 500B. FIG. 6C shows the data path at the Rx terminal 500B. Relative to the Rx terminal 500B, the incoming beam is its Rx beam, but it is labelled as transmit beam 105A in FIG. 6C to maintain consistency throughout the figures. The transmit beam 105A is optically coupled from telescope 600, to beam steering unit 605, fiber 615, and circulator 620 to the Rx detector 630. The output of the Rx detector 630 is demodulated by modem 635 to produce the outgoing digital data.

FIG. 6A shows both aspects for a single terminal. The terminal 500 includes at least two optical paths: an Rx beam path and a Tx beam path. In the Rx beam path, a Rx beam 105B propagates through the telescope 600 and is directed towards the beam steering unit 605. The beam steering unit 605 steers the Rx beam to the wavefront sensor 610. A portion of the beam is detected by the wavefront sensor 610 and another portion of the beam is coupled into the fiber 615. Light in the fiber 615 is directed by the circulator 620 to the Rx detector 630. In the Tx beam path, a Tx beam from the Tx source 625 is directed to the fiber 615 by the circulator 620. The Tx beam is emitted from the fiber 615 and towards the beam steering unit 605. The Tx beam is directed by the beam steering unit 605 towards the telescope 600. The Tx beam 105A propagates through the telescope 600 and into free space.

The telescope 600 and beam steering unit 605 are optical components that direct Rx beams to the wavefront sensor 610 and fiber 615, and direct Tx beams to the remote terminal. In some embodiments, the telescope 600 is positioned upstream of the beam steering unit 605 with respect to the Tx beam path. The telescope 600 includes one or more components that can spread, focus, redirect, collimate, project, and otherwise modify the beams 105 passing through it. The position of the telescope 600 relative to the terminal 500 is typically fixed. The telescope 600 may be as simple as a single lens or it may include different or additional optical components, such as diffusers, phase screens, beam expanders, mirrors, and lenses. The components from the fiber 615 to the telescope 600 may also be referred to as a fore optic. Aspects regarding the Risley prism system were further described above.

Many embodiments of the beam steering unit 605 are possible. This can be, for example, a mechanically driven reflective or refractive device. Examples of such devices include mirrors, Fresnel devices, and lenslet arrays. The mechanical driver for any one of these examples may include voice-coil actuators, piezoelectric actuators, and servo-motor driven positioners. Additionally or alternatively, microelectronic array (MEMS) devices or optoacoustic devices that exploit acoustic waves in reflective or refractive materials can be used.

The beam steering unit 605 may operate in different modes, such as a beam acquisition mode or a beam tracking mode. For example, an initial Tx direction can be established through a beam acquisition mode. The Tx direction may be determined or updated based on feedback signals (e.g., alignment errors), for example from the controller 650, modem 635, and the wavefront sensor 610 (this feedback path not shown in FIG. 6). In some cases, the Tx beam 105A is transmitted by the telescope 600 along the same direction as the Rx beam 105B is received (the Rx direction may be determined from the wavefront sensor 610). In some cases, the Tx direction is not parallel to the Rx direction. For example, atmospheric conditions between terminals 500 can affect beams differently depending on their propagation direction. In these cases, Tx and Rx beams may travel different optical paths between terminals 500. In another example, the Tx beam is directed towards an expected future location of a remote terminal 500 (referred to as point ahead).

The wavefront sensor 610 is described with reference to FIGS. 7A and 7B. FIG. 7A is a front view of the wavefront sensor 610 and FIG. 7B is a perspective view of the wavefront sensor 610. The wavefront sensor 610 is a component that detects incident light (e.g., the Rx beam 105B) for position detection, acquisition, and tracking. The wavefront sensor 610 may be located at a focal plane 712 of the telescope 600. The wavefront sensor 610 includes a cavity (e.g., in the center) that surrounds an end of the Tx/Rx fiber 615. Thus, when an Rx beam 105B is directed to the focal plane 712, the Tx/Rx fiber 615 receives a portion of the Rx beam (the first portion 706A) and the wavefront sensor 610 receives another portion of the Rx beam (the second portion 706B). This allows light directed to the wavefront sensor 610 to be coupled into the fiber 615.

The wavefront sensor 610 is used for signal acquisition and alignment of the FSO terminal 500. To do this, the wavefront sensor 610 includes detectors 704 to determine the position of the incident Rx beam 105B. Based on the detected position of the Rx beam 105B, the FSO terminal 500 can align components of the FSO terminal 500 (e.g., the telescope 600, beam steering unit 605, or the wavefront sensor itself) so that the Rx beam 105B is centered on the wavefront sensor 610. The Rx beam 105B may be directed to another location on the wavefront sensor 601, for example if the fiber 615 is not centered on the sensor 610 or to account for point ahead. Components other than a wavefront sensor may additionally or alternately perform position detection, acquisition, and tracking. By way of example, a sensor can be an overmoded guided-wave structure with a means to measure the power in the structure's propagating modes.

In the example of FIGS. 7A and 7B, the wavefront sensor 610 is a quad-cell sensor. However other multi-cell sensors may be used. Together, the four detectors 704 can be used to determine the horizontal and vertical position of the Rx beam 105B on the wavefront sensor 610. The detectors 704 may be photodetectors or other electromagnetic-wave detectors that convert the incoming electromagnetic waves into electrical current. The wavefront sensor 610 can include light detectors capable of detecting different types of light signals, e.g., low and high light intensities, specific wavelengths, etc. This allows the terminal 500 to operate in low light (e.g., at night) and high light situations (e.g., at mid-day).

Referring back to FIGS. 6A-C, the Tx/Rx fiber 615 is an optical fiber, such as a multi-mode fiber (MMF), dual core fiber, or double clad fiber. If the fiber 615 is a double clad fiber, Tx beams may propagate through the core while Rx beams propagate through the inner cladding. The circulator 620 can be a single-mode or multi-mode circulator. Example circulators are described in patent application Ser. No. 16/259,899 "Optical Circulator with Double-Clad Fiber" which is incorporated herein by reference in its entirety. The Rx detector 630 is a photodetector that converts Rx beams from the circulator 620 into electrical signals. For example, the Rx detector 630 is an avalanche photodiode (APD). The Tx source 625 converts transmit data from the modem 635 into Tx beams. The Tx source 625 can include a laser.

The modem 635 modulates data to be transmitted in Tx beams. Specifically, the modem 635 converts incoming data from the I/O interface 640 into a modulated electrical signal. The modulated signal is sent to the Tx source 625 and converted into a Tx beam. The modem 635 can also demodulate data encoded in Rx beams. Specifically, the modem 635 decodes information in the electrical signals from the Rx detector 630. The remaining decoded information may be transmitted to I/O interface (e.g., to be transmitted to another terminal). The modem 635 can include any electronics and/or computer instructions that modulate or demodulate signals, including physical (PHY) layer or medium access control (MAC) related processes (such as error correction).

The beacon source 627 is an optical source (such as a laser) that can produce Tx optical beams 105. If the beacon source 627 and the Tx source 625 are separate components, the beacon source 627 may share a port of the circulator 620 with the Tx source 625 so that beams from the beacon source 627 are also directed by the fiber 615, beam steering unit 605 and telescope 600. In some embodiments, beams from the beacon source 627 have a fixed wavelength. In other embodiments, the beacon source 627 can produce optical beams at different wavelengths.

Optical beams 105 from the beacon source 627 may be used as beacon beams during a beam acquisition process to establish an FSO communication link and also during a tracking mode to maintain the FSO communication link. As a result, beacon beams typically have larger divergences than data-encoded beams from the Tx source 625. For example, the divergence of beacon beams may be two to four times larger than the divergence of the data-encoded beams (however larger and smaller ratios are also possible). Beam divergence is a measure of the increase in a beam's diameter or radius with distance. In some embodiments, the beacon source 627 and the Tx source 625 are a single component. That is, for example, the optical beam produced by the single source 627/625 is used both as a beacon beam during the beam acquisition process and as the data-encoded beam during data transmission.

The controller 650 receives information (e.g., from the wavefront sensor 610 and the modem 635) to determine alignment errors between the terminal 500A and the remote terminal 500B. The controller 650 provides instructions (e.g., to the beam steering unit 605) to reduce the alignment errors. The controller 650 may also control the Risley prism system and chromatic Risley prism pair.

In some cases, the Tx/Rx fiber 615 is a double clad fiber, where the Tx beam propagates along the single mode center of the fiber but the fiber has a larger multimode area for coupling the Rx beam. The end of the fiber is located at the focal plane 712 of the telescope 600. Since it may be difficult to place an object exactly at the focal plane, the phrase "at the focal plane" as used herein may refer to objects close enough to the focal plane that defocusing losses remain within acceptable limits for communication purposes. For example, an object "at the focal plane" may refer to an object within 60 micrometers of the focal plane. In some embodiments, Tx beam collimation is more important than Rx focusing, and this sets the maximum acceptable distance for objects "at the focal plane." Tx beam collimation may depend on system focal length and it may vary between systems. In some embodiments, fibers may not be physically located at the focal plane 712. For example, an optical relay system may be used so that a fiber end can be spaced apart from the focal plane.

As previously described, the telescope 600 includes optical components that receive the Rx beam 105B and focus it to a Rx spot 225B at the focal plane and that direct the Tx beam 105A from a Tx spot 225A at the focal plane to the remote terminal (e.g., see FIG. 3). In some cases, the telescope 600 includes a window that allows beams to propagate in and out of the terminal, a bi-focal lens, and a converging lens. When it is used, the bi-focal lens may distribute some of the Rx signal over the WFS 610 and may thereby enable the telescope 600 to be pointed accurately toward the incoming Rx beam 105B. However, the telescope 600 may include different, additional, or fewer optical components. For illustrative convenience, the rays of the Rx and Tx beams are illustrated as if the optical components of the telescope 600 form a single optical component (the beams propagate straight through the telescope 600). However, each of the optical components may affect the beams according to their optical properties (e.g., the beams are bent by the Risley prism system as described previously). The remaining figures are similarly illustrated in this fashion.

Without the Risley prism system, the telescope 600 may direct the Rx beam 105B and the Tx beam 105A without angular separation in free space. In that case, the Tx and Rx beams 105 propagate along a same fiber (the Tx/Rx fiber 615) and then parallel to each other in free space. In some cases, the Tx/Rx fiber 615 is a double-clad fiber where the Tx beam 105A propagates through the single-mode core and the Rx beam 105B is coupled into the multi-mode cladding.

However, with the Risley prism system, the Tx and Rx beams 105A,B may be angularly separated in free space while still coupling to the same spot at the focal plane 712 so that the beams can be coupled to/from the same fiber 615.

In some embodiments, it is advantageous to reduce the size or weight of the FSO terminal (e.g., the terminal is mounted to an aircraft or satellite). In these embodiments, the maximum thickness of the prisms in the Risley prism system may be 51 millimeters or less (e.g., measured as the largest distance between the input and output surfaces).

In some situations, the remote terminal may be in motion relative to the local terminal. To account for travel time of the Tx beam (e.g., when the relative velocity or distance between the local and the remote terminal is large), the local terminal may direct a Tx beam towards an expected future location of the remote terminal (instead of the current location of the remote terminal). This is generally referred to as point ahead, and the angular bias between the Rx and Tx beams is referred to as the point ahead angle. Depending on the situation, point ahead angles are approximately 100 μrad or less. The angular separation of the Tx and Rx beams may be set based on the point ahead angle.

Although the above descriptions are described in the context of FSO communications, the above description may be applicable for applications outside of FSO communications, and thus should not be limited to FSO communications. For example, the descriptions may be applicable for remote sensing applications.

Additional Considerations

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Note that the components and terminals illustrated and described can include any electronics and/or computer instructions that may be embodied in digital or analog circuits. This may be implemented using any one or more of Application Specific Integrated Circuits (ASICs), field-programmable gate arrays (FPGAs), and general-purpose computing circuits, along with corresponding memories and computer program instructions for carrying out the described operations. The specifics of these components are not shown for clarity and compactness of description.

Depending on the form of the components, the "coupling" between components may take different forms. For example, dedicated circuitry can be coupled to each other by hard-wiring or by accessing a common register or memory location, for example. Software "coupling" can occur by any number of ways to pass information between software components (or between software and hardware, if that is the case). The term "coupling" is meant to include these examples and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate +/−10% unless another meaning is apparent from the context. From example, "approximately ten" should be understood to mean "in a range from nine to eleven."

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

What is claimed is:

1. A local free space optical (FSO) communication terminal configured to transmit and receive optical beams, the local FSO communication terminal comprising:
   a fore optic, wherein a receive (Rx) optical beam is received by the local FSO communication terminal from free space through the fore optic and a transmit (Tx) optical beam is transmitted by the local FSO communication terminal through the fore optic into free space, wherein the Rx and Tx optical beams are different wavelengths;
   a first Risley prism pair positioned along optical paths of both the Rx and Tx optical beams, where the first Risley prism pair is a chromatic Risley prism pair;
   a second Risley prism pair positioned along the optical paths of the Rx and Tx optical beams; and
   a controller that controls the first Risley prism pair and the second Risley prism, based on pointing the Rx and Tx optical beams in free space and adjusting an angular separation in free space between the Rx and Tx optical beams.

2. The FSO communication terminal of claim 1, wherein the second Risley prism pair is an achromatic Risley prism pair.

3. The FSO communication terminal of claim 2, wherein the controller controls the achromatic Risley prism pair, based on reducing a common mode offset introduced by the chromatic Risley prism pair.

4. The FSO communication terminal of claim 1, wherein the first Risley prism pair is positioned in a collimated space of the fore optic.

5. The FSO communication terminal of claim 1, further comprising:
   a telescope that receives the Rx optical beam from free space and transmits the Tx optical beam into free space, the telescope having a focal plane; and
   a relay lens between the focal plane and an optical fiber, wherein the first Risley prism pair is positioned in a collimated space within the relay lens.

6. The FSO communication terminal of claim 5, wherein the optical fiber is a multi-core fiber with a first core and a smaller second core, wherein the Rx optical beam is coupled into the first core and the Tx optical beam is coupled out of the second core.

7. The FSO communication terminal of claim 1, further comprising:
   a telescope that receives the Rx optical beam from free space and transmits the Tx optical beam into free space, the telescope having a focal plane; and
   a relay lens between the focal plane and an optical fiber, wherein the first Risley prism pair is positioned in a collimated space within the relay lens, the first Risley prism pair causes a lateral separation of the Rx and Tx optical beams at the focal plane, and the lateral separation causes the angular separation in free space between the Rx and Tx optical beams.

8. The FSO communication terminal of claim 1, wherein the Rx optical beam propagating in free space is more aligned to an optical axis of the fore optic than the Tx optical beam.

9. The FSO communication terminal of claim 1, wherein the angular separation is adjustable over a range of at least 50 μrad.

10. The FSO communication terminal of claim 1, wherein the Rx optical beam is a data-encoded optical beam received from a remote FSO communication terminal, and the Tx optical beam is a data-encoded optical beam transmitted to the remote FSO communication terminal.

11. The FSO communication terminal of claim 10, wherein the angular separation is adjusted according to a point-ahead angle resulting from a relative motion between the local and remote FSO communication terminals.

12. The FSO communication terminal of claim 10, wherein the wavelengths of the Tx and Rx optical beams are selected from wavebands defined by ITU (International Telecommunication Union) channels.

13. The FSO communication terminal of claim 10, wherein the wavelengths of the Tx and Rx optical beams are both within 100 nm of 1064 nm.

14. The FSO communication terminal of claim 1, wherein the controller also controls a wavelength of the Tx optical beam to adjust the angular separation.

15. A terminal comprising:
   a telescope, wherein a receive (Rx) optical beam is received from free space through the telescope and a transmit (Tx) optical beam is transmitted through the telescope into free space, the telescope having a focal plane, wherein the Rx and Tx optical beams are different wavelengths;
   an optical fiber, wherein the Rx optical beam is coupled into the optical fiber and the Tx optical beam is coupled out of the optical fiber;
   a relay lens between the focal plane and the optical fiber;

a chromatic Risley prism pair and an achromatic Risley prism pair that are positioned in a collimated space within the relay lens; and a controller that controls both the achromatic and chromatic Risley prism pairs based on pointing the Rx and Tx optical beams in free space and adjusting an angular separation between the Rx and Tx optical beams in free space.

16. A free space optical (FSO) communication system comprising two FSO communication terminals configured to transmit and receive data-encoded optical beams to each other, each FSO communication terminal comprising:

a fore optic, wherein a receive (Rx) optical beam is received by that FSO communication terminal from the other FSO communication terminal through the fore optic and a transmit (Tx) optical beam is transmitted by that FSO communication terminal to the other FSO communication terminal through the fore optic, wherein the Rx and Tx optical beams are different wavelengths;

a first Risley prism pair positioned along optical paths of both the Rx and Tx optical beams, where the first Risley prism pair is a chromatic Risley prism pair;

a second Risley prism pair positioned along the optical paths of both the Rx and Tx optical beams; and a controller that controls the first Risley prism pair and the second Risley prism pair based on adjusting an angular separation in free space between the Rx and Tx optical beams.

17. The FSO communication system of claim 16, wherein the two FSO communication terminals mutually determine the wavelengths of the Rx and Tx optical beams.

18. The FSO communication system of claim 16, wherein the second Risley prism pair is an achromatic Risley prism pair.

19. The FSO communication system of claim 18, wherein the controller controls the achromatic Risley prism pair based on reducing a common mode offset introduced by the chromatic Risley prism pair.

20. The FSO communication system of claim 16, wherein the first Risley prism pair is positioned in a collimated space of the fore optic.

* * * * *